(12) United States Patent
Richard (10) Patent No.: US 11,308,000 B1
(45) Date of Patent: Apr. 19, 2022

(54) CONFIGURABLE PCI-E INTERFACE MODULE

(75) Inventor: Jared Richard, Fort Collins, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 1995 days.

(21) Appl. No.: 13/247,482

(22) Filed: Sep. 28, 2011

(51) Int. Cl.
*G06F 13/00* (2006.01)
*G06F 13/14* (2006.01)
*G06F 15/16* (2006.01)

(52) U.S. Cl.
CPC .............. *G06F 13/00* (2013.01); *G06F 13/14* (2013.01)

(58) Field of Classification Search
CPC .......... G06F 15/16; G06F 13/00; G06F 13/20; G06F 13/40; G06F 13/14
USPC .............................. 710/313; 398/140; 702/66
See application file for complete search history.

(56) References Cited

U.S. PATENT DOCUMENTS

| | | | | |
|---|---|---|---|---|
| 6,274,827 | B1* | 8/2001 | Loffler | 200/38 D |
| 7,032,052 | B2* | 4/2006 | Sauber | G06F 13/385 710/301 |
| 7,518,613 | B2* | 4/2009 | Knepper | 345/501 |
| 7,657,688 | B2* | 2/2010 | Atherton et al. | 710/307 |
| 7,917,682 | B2* | 3/2011 | Bakthavathsalam | G06F 3/0607 710/315 |
| 8,090,263 | B2* | 1/2012 | Mussatt | G06F 13/4045 398/116 |
| 8,458,383 | B1* | 6/2013 | Wortman | G06F 13/14 709/230 |
| 2006/0294279 | A1* | 12/2006 | McKee et al. | 710/301 |
| 2008/0244141 | A1* | 10/2008 | Babin | G06F 13/4081 710/301 |
| 2009/0049216 | A1* | 2/2009 | Atherton et al. | 710/107 |
| 2009/0265590 | A1* | 10/2009 | Li | 714/716 |
| 2010/0199011 | A1* | 8/2010 | Chen | G06F 13/4063 710/301 |
| 2010/0211715 | A1* | 8/2010 | Huang et al. | 710/314 |
| 2011/0029709 | A1* | 2/2011 | Feiereisel | G06F 13/385 710/305 |
| 2011/0058573 | A1* | 3/2011 | Balakavi | H04L 49/602 370/463 |
| 2011/0066909 | A1* | 3/2011 | Skirmont et al. | 714/746 |
| 2011/0125601 | A1* | 5/2011 | Carpenter et al. | 705/26.1 |
| 2011/0130989 | A1* | 6/2011 | Lu et al. | 702/66 |
| 2011/0153899 | A1* | 6/2011 | Aldereguia | G06F 13/385 710/313 |
| 2011/0271029 | A1* | 11/2011 | Ho | G06F 13/385 710/313 |
| 2012/0005392 | A1* | 1/2012 | Yagi | 710/313 |
| 2012/0082463 | A1* | 4/2012 | Kasprzyk | 398/140 |

(Continued)

OTHER PUBLICATIONS

Molex, External pCI Express (PCIe) x1,x4,x8, x16 I/O products, Molex, 2006.*

(Continued)

*Primary Examiner* — Henry Tsai
*Assistant Examiner* — Christopher A Daley (57) ABSTRACT

A peripheral component interconnect express (PCI-E) interface module is configured to operate as a host module or a target module. The PCI-E interface module can be employed in a system slot or one of multiple peripheral slots of a PCI-E compatible chassis. In addition, the PCI-E interface module is configured to communicate through passive copper cable or active optical cable.

13 Claims, 12 Drawing Sheets

(56) References Cited

U.S. PATENT DOCUMENTS

| | | | |
|---|---|---|---|
| 2012/0102338 A1* | 4/2012 | Sultenfuss | G06F 1/26 |
| | | | 713/300 |
| 2012/0120967 A1* | 5/2012 | Ghiasi et al. | 370/464 |
| 2012/0191887 A1* | 7/2012 | Yamauchi et al. | 710/106 |
| 2012/0217977 A1* | 8/2012 | Gao et al. | 324/543 |
| 2012/0317330 A1* | 12/2012 | Cong | G06F 13/385 |
| | | | 710/316 |
| 2013/0031288 A1* | 1/2013 | Richard | 710/301 |
| 2013/0042019 A1* | 2/2013 | Galles | H04L 29/00 |
| | | | 709/232 |

OTHER PUBLICATIONS

Richard Quinnell, Hybrids Jump-start PXI Express, Feb. 1, 2007, www.embedded.com.*

* cited by examiner

|  | XP4 / XJ4 Connector | | | | | | XP3 / XJ3 Connector | | | | | | XP2 / XJ2 Connector | | | | | |
|---|---|---|---|---|---|---|---|---|---|---|---|---|---|---|---|---|---|---|
| Pin | Z | A | B | C | D | E | F | Pin | A | B | ab | C | D | cd | E | F | ef |
| 1 | GND | GA4 | GA3 | GA2 | GA1 | GA0 | GND | 1 | RSV | RSV | GND | RSV | RSV | GND | RSV | RSV | GND |
| 2 | GND | 5Vaux | GND | SYSEN# | WAKE# | ALERT# | GND | 2 | RSV | GND | GND | PWR_OK | PS_ON# | GND | LINKCAP | PWRBTN# | GND |
| 3 | GND | RSV | RSV | RSV | RSV | RSV | GND | 3 | SMBDAT | SMBCLK | GND | RSVD | RSVD | GND | RSVD | RSVD | GND |
| 4 | GND | RSV | RSV | PXITRIG5 | RSV | RSV | GND | 4 | RSV | PERST# | GND | 2RefClk+ | 2RefClk- | GND | 1RefClk+ | 1RefClk- | GND |
| 5 | GND | PXITRIG3 | PXITRIG4 | PXITRIG5 | GND | PXITRIG6 | GND | 5 | 1PETp0 | 1PETn0 | GND | 1PERp0 | 1PERn0 | GND | 1PETp1 | 1PETn1 | GND |
| 6 | GND | PXITRIG2 | GND | RSV | PXISTAR | PXICLK10 | GND | 6 | 1PETp2 | 1PETn2 | GND | 1PERp2 | 1PERn2 | GND | 1PERp1 | 1PERn1 | GND |
| 7 | GND | PXITRIG1 | PXITRIG0 | RSV | GND | PXITRIG7 | GND | 7 | 1PETp3 | 1PETn3 | GND | 1PERp3 | 1PERn3 | GND | 2PETp0 | 2PETn0 | GND |
| 8 | GND | RSV | GND | RSV | RSV | PXILBR6 | GND | 8 | 2PETp1 | 2PETn1 | GND | 2PERp1 | 2PERn1 | GND | 2PERp0 | 2PERn0 | GND |
|  |  |  |  |  |  |  |  | 9 | 2PETp2 | 2PETn2 | GND | 2PERp2 | 2PERn2 | GND | 2PETp3 | 2PETn3 | GND |
|  |  |  |  |  |  |  |  | 10 | 3PETp0 | 3PETn0 | GND | 3PERp0 | 3PERn0 | GND | 2PERp3 | 2PERn3 | GND |

|  | XP1 / XJ1 Connector | | | | | | |
|---|---|---|---|---|---|---|---|
| Pin | A | B | ab | C | D | cd | E | F | ef |
| 1 | 3PETp1 | 3PETn1 | GND | 3PERp1 | 3PERn1 | GND | 3PETp2 | 3PETn2 | GND |
| 2 | 3PETp3 | 3PETn3 | GND | 3PERp3 | 3PERn3 | GND | 3PERp2 | 3PERn2 | GND |
| 3 | 4PETp0 | 4PETn0 | GND | 4PERp0 | 4PERn0 | GND | 4PETp5 | 4PETn5 | GND |
| 4 | 4PETp2 | 4PETn2 | GND | 4PERp2 | 4PERn2 | GND | 4PERp5 | 4PERn5 | GND |
| 5 | 4PETp3 | 4PETn3 | GND | 4PERp3 | 4PERn3 | GND | RSV | RSV | GND |
| 6 | RSV | RSV | GND | RSV | RSV | GND | RSV | RSV | GND |
| 7 | RSV | RSV | GND | RSV | RSV | GND | RSV | RSV | GND |
| 8 | RSV | RSV | GND | RSV | RSV | GND | RSV | RSV | GND |
| 9 | RSV | RSV | GND | RSV | RSV | GND | RSV | RSV | GND |
| 10 | RSV | RSV | GND | RSV | RSV | GND | RSV | RSV | GND |

| Pin | |
|---|---|
| G | GND |
| F | 12V |
| E | 12V |
| D | GND |
| C | 5V |
| B | 3.3V |
| A | GND |

RSV Pins

Fig. 6

| Pin | Z | A | B | C | D | E | F | XP4 / XJ4 Connector |
|---|---|---|---|---|---|---|---|---|
| 1 | GND | GA4 | GA3 | GA2 | GA1 | GA0 | GND | |
| 2 | GND | 5Vaux | GND | SYSEN# | WAKE# | ALERT# | GND | |
| 3 | GND | 12V | 12V | GND | GND | GND | GND | |
| 4 | GND | GND | GND | 3.3V | 3.3V | 3.3V | GND | |
| 5 | GND | PXI_TRIG3 | PXI_TRIG4 | PXI_TRIG5 | GND | PXI_TRIG6 | GND | |
| 6 | GND | PXI_TRIG2 | GND | | PXI_STAR | PXI_CLK10 | GND | |
| 7 | GND | PXI_TRIG1 | PXI_TRIG0 | | GND | PXI_TRIG7 | GND | |
| 8 | GND | RSV | GND | RSV | | PXI_LBR6 | GND | |

| Pin | A | B | ab | C | D | cd | E | F | ef | XP3 / XJ3 Connector |
|---|---|---|---|---|---|---|---|---|---|---|
| 1 | | | | | | GND | | RSV | GND | |
| 2 | | | GND | | | GND | | RSV | GND | |
| 3 | | | GND | RSV | RSV | GND | | 1RefClk+ | 1RefClk- | |
| 4 | | | GND | RSV | RSV | GND | | 1PETp1 | 1PETn1 | |
| 5 | 1PETp0 | 1PETp0 | GND | 1PERp0 | 1PERn0 | GND | | 1PERp1 | 1PERn1 | |
| 6 | 1PETp2 | 1PETp2 | GND | 1PERp2 | 1PERn2 | GND | | 2PERp0 | 2PETn0 | |
| 7 | 1PETp3 | 1PETn3 | GND | 1PERp3 | 1PERn3 | GND | | 2PERp0 | 2PERn0 | |
| 8 | 2PETp1 | 2PETn1 | GND | 2PERp1 | 2PERn1 | GND | | 2PERp3 | 2PETn3 | |
| 9 | 2PETp2 | 2PETn2 | GND | 2PERp2 | 2PERn2 | GND | | 2PERp3 | 2PERn3 | |
| 10 | RSV | RSV | GND | RSV | RSV | GND | | | | |

Power Pins

CONFIGURABLE PCI-E INTERFACE MODULE

BACKGROUND

Peripheral component interconnect (PCI) and PCI express (PCI-E) have become dominant standards for connecting peripheral devices in personal computers (PCs) and other electronic systems. Variations of these standards have also been developed for connecting peripheral devices in other environments, such as modular systems. For example, compact PCI (CPCI) and CPCI express (CPCI-E) are ruggedized versions of PCI and PCI-E for external chassis, and PCI eXtensions for instrumentation (PXI) and PXI express (PXI-E) are modified versions of the CPCI and CPCI-E standards that have been adapted to include instrumentation signals for test and measurement systems.

Because CPCI/CPCI-E and PXI/PXI-E are derived from PCI, they require a host to control them. For example, CPCI-E and PXI-E chassis are typically controlled by an embedded PC or a remote cabled interface. The embedded PC can be used to implement a chassis in a standalone configuration, and the remote cabled interface can be used for a chassis that functions as a logical extension of a remote host.

The embedded PC typically comprises an independent host chipset mounted on a module card in a chassis. This chipset can implement the root complex of the CPCI-E or PXI-E device tree and control communication between peripheral devices in the chassis, similar to an ordinary consumer PC. Meanwhile, the remote cabled interface comprises a host cable adapter and a target cable adapter that connects a host system to a target system. The host cable adapter typically resides in the host system and controls the target system by transmitting control and data signals to the target cable adapter through a cable. The target cable adapter is connected within the target system, and it controls the target system or device under direction of the host cable adapter.

The host and target cable adapters have signaling protocols defined by a PCI-E cabling specification. In CPCI-E and PXI-E, a target cable adapter (e.g., National Instruments' (NI's) PXI-E-8360, -8370) controls other peripherals in a chassis, and a host cable adapter (e.g., NI's PXI-E-8262) controls a downstream device, such as a downstream chassis or a redundant array of independent disks (RAID) system, through a target cable adapter. The target and host cable adapters are typically implemented in cabled PCI-E interface modules that can be inserted into slots within a chassis. For example, the target cable adapter is typically implemented in a target cabled PCI-E interface module (or "target module") that can be inserted into a system slot of a chassis to control other chassis components. Meanwhile, the host cable adapter is typically implemented in a host cabled PCI-E interface module (or "host module") that can be inserted into a peripheral slot of a chassis to control downstream devices.

One shortcoming of conventional cabled PCI-E interface modules is that they are restricted to unidirectional operation. In other words, within a particular slot of a chassis, a conventional cabled PCI-E interface module can only function as a host module or a target module, but not both. This is due in part to the pin configuration of slots in PCI-E based chassis, particularly the unidirectional control, or sideband, signals. For example, in conventional CPCI-E and PXI-E chassis, the system slot has a pin configuration that allows connection of a target cable adapter but not a host cable adapter, and the peripheral slots have pin configurations that allow connection of a host cable adapter but not a target cable adapter. This unidirectional limitation can prevent users from taking full advantage of chassis resources under certain circumstances. For example, it can prevent users from reusing modules for different or multiple configurations as a test system develops.

Another shortcoming of conventional cabled PCI-E interface modules is that they are limited to communicating through specific types of connector cables. For example, most PCI-E interface modules communicate through passive copper cables, while some modules communicate through active optical cables. These different types of connector cables are generally considered to be mutually exclusive due to their different properties. For example, passive copper cables and optical cables can be difficult to interoperate because of complications that arise when transmitting information between their different media, and the unavailability of optical cables in common form factors. Due to this limitation, users may be required to invest in multiple different sets of cabled PCI-E interface modules for alternative system configurations or applications.

In light of the above shortcomings of conventional cabled PCI-E interface modules, there is a need for improved modules to provide users and system designers with greater flexibility and more efficient use of chassis resources.

SUMMARY

In a representative embodiment, a PCI-E interface module comprises a first connector configured to interface with a PCI-E compatible cable, a second connector configured to interface with a PCI-E based chassis, a signal driving device configured to process data transmitted along a data path between the first and second connectors, and a selection device configured to select a configuration of the signal driving device according to a current state of the PCI-E interface module.

In another representative embodiment, a PCI-E based system comprises a PCI-E based chassis comprising a system slot and a plurality of peripheral slots, and a PCI-E interface module configured to be connected with the system slot and the plurality of peripheral slots and configured to alternately function as a host module and a target module.

In another representative embodiment, a method of configuring a PCI-E interface module comprises detecting a state of the PCI-E interface module, and based on the detected state, controlling a signal driving device of the PCI-E interface module to operate the PCI-E interface module in one of two mutually exclusive modes.

BRIEF DESCRIPTION OF THE DRAWINGS

The described embodiments are best understood from the following detailed description when read with the accompanying drawing figures. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings. As used in the specification and appended claims, the terms 'a', 'an' and 'the' include both singular and plural referents, unless the context clearly dictates otherwise. Thus, for example, 'a device' includes one device and plural devices.

The described embodiments relate generally to cabled PCI-E interface modules that can be reconfigured to operate in different directions and/or with different types of connector cables. For example, some embodiments provide a module that can operate as a host or target cabled PCI-E interface module according to current system requirements. In addition, some embodiments provide modules that can communicate through passive copper cable or active optical cable according to current system requirements.

In certain embodiments, a single PCI-E cabled interface module implements bidirectional operation by including parallel circuit pathways for host and target sideband signals defined by the PCI-E specification. The module can be switched between a host configuration in which it operates as a host module, and a target configuration in which it operates as a target module, by alternately employing the circuits for the host sideband signals and those for the target sideband signals according to the selected configuration. The configuration can be selected by toggling a switch between two corresponding positions. In addition, the module can be connected to a system slot or peripheral slots of the chassis, so each slot can be configured as an upstream slot or a downstream slot according to the module's configuration. The Agilent M9018A chassis, for example, has a reconfigurable backplane that can define each slot as an upstream slot or a downstream slot as needed.

The above features can provide more flexibility and more efficient use of chassis resources. For example, if a user decides to change a target cabled interface module out with an embedded controller, the cabled interface module can then be repurposed as a host capable connection to a cascaded chassis or external resource such as a RAID system. In addition, the above features can allow for more efficient manufacture of chassis components. For example, because the bidirectional module can function as a host module and a target module, manufacturers could focus their efforts on producing bidirectional modules rather than separate host and target modules, which may provide benefits in terms of cost and quality. Finally, the bidirectional modules enable a multi-host chassis by allowing bidirectional connections through any slot of the chassis instead of limiting host connections to the system slot.

In certain other embodiments, a single PCI-E cabled interface module is configured to be compatible with multiple physical cable standards, including passive copper cables and active optical cables. This can be accomplished, for example, by providing an active optical cable connector using the same connection standard as a passive copper cable, providing the ability to change the signal driving characteristics of the module depending on a type of cable connected to the module, and providing an ability to sense the type of cable connected to the module in order to change the signal driving characteristics.

By providing compatibility and optimization for multiple cable standards in a single device, these embodiments can eliminate the prohibitively high cost of optical cables from design considerations while still allowing other users to take advantage of the benefits of active optical cables.

Although the described embodiments are not restricted to a particular type of chassis or platform, certain embodiments find ready application in existing platforms such as Agilent's M9018A, as will be apparent to those skilled in the art.

Figure 1:
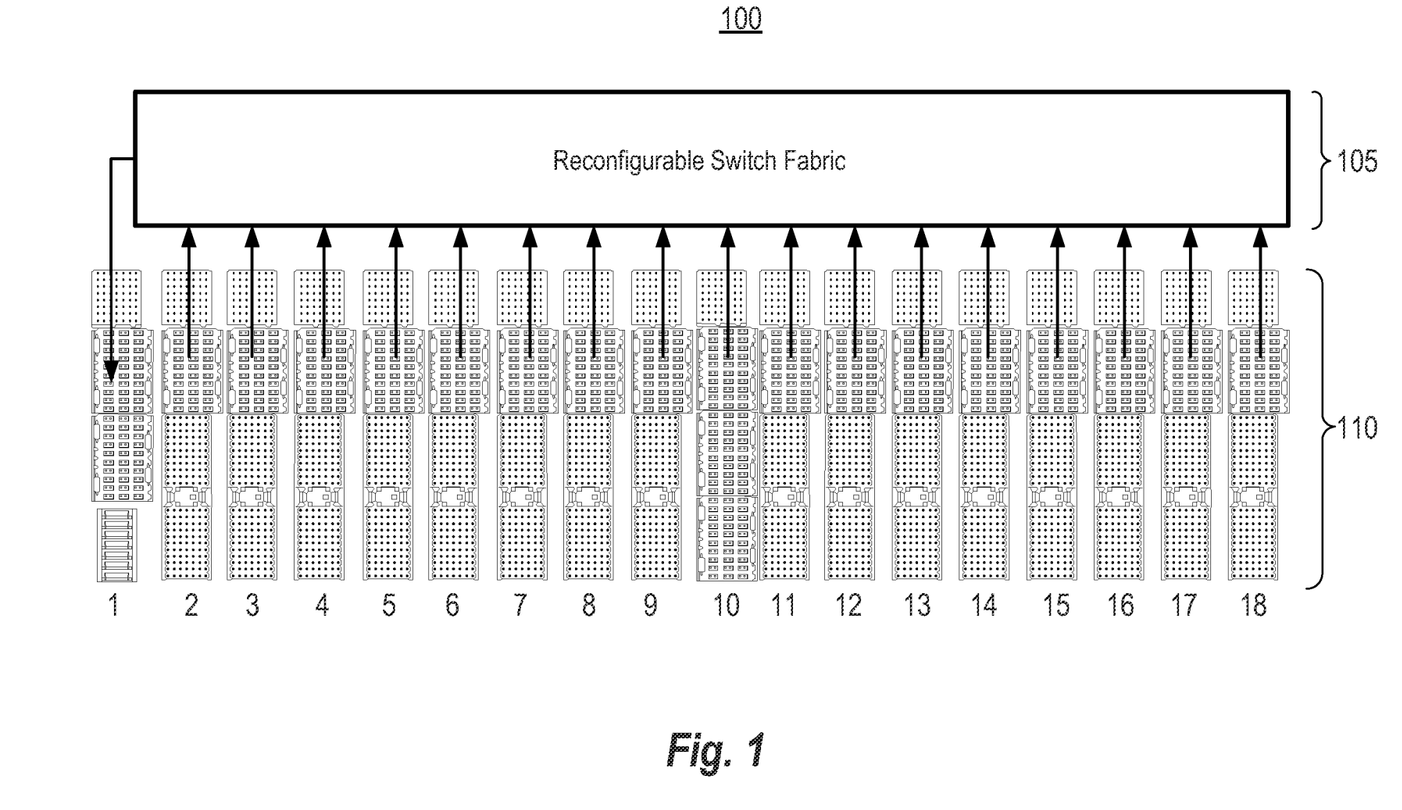
FIG. 1 is a schematic diagram of a PCI-E based chassis according to an example embodiment.

FIG. 1 is a schematic diagram of a PXI-E chassis 100 according to an example embodiment. PXI-E chassis 100 is one example of a PCI-E based chassis that could be used with various embodiments.

Referring to FIG. 1, PXI-E chassis 100 comprises a reconfigurable switch fabric 105 and a plurality of module slots 110. Module slots 110 comprise a plurality of slots 1 through 18, including a system slot 1, a timing slot 10, and a plurality of peripheral slots 2 through 18.

System slot 1 is designated to receive a system controller for controlling modules in each of the other slots. It can also receive a cabled PCI-E interface module, such as a host module or a target module. System slot 1 comprises a connector for power, another connector for PCI-E, and an instrument specific connector.

Timing slot 10 is designated to receive a timing module for generating timing and synchronization signals for the other slots. It comprises a connector for providing timing signals as well as a connectivity as a PXI-E peripheral slot.

Peripheral slots 2-18 are designated to receive peripheral modules. They can also receive cabled PCI-E interface modules, such as host modules or target modules. Peripheral slots 2-9 and 11-18 are all hybrid slots, with each one comprising a 32-bit PCI connector, a PCI-E connector, and a connector for instrument functions such as taps, triggers, and clocks. The timing slot 10 has special connectors dedicated to timing and synchronization functionality but can operate as a peripheral slot whether these resources are used or not.

Reconfigurable switch fabric 105 is used to route signals between different parts of PXI-E chassis 100. Reconfigurable switch fabric 105 comprises PCI-E switches that can be reconfigured using one or more switch images stored in a memory device such as an electrically erasable programmable read only memory (EEPROM). These switch images are typically loaded into reconfigurable switch fabric 105 upon powering up or resetting PXI-E chassis 100, and they define certain characteristics of PXI-E chassis 100, such as a number of links for communicating between slot 1 and the peripheral slots, and whether a certain slot should be designated to receive a target or host module. The switch image(s) can be selected by a user from among multiple stored images. For example, a user wishing to designate a peripheral slot as a downstream target slot may select a switch image that allows it to receive a target module.

Figure 2:
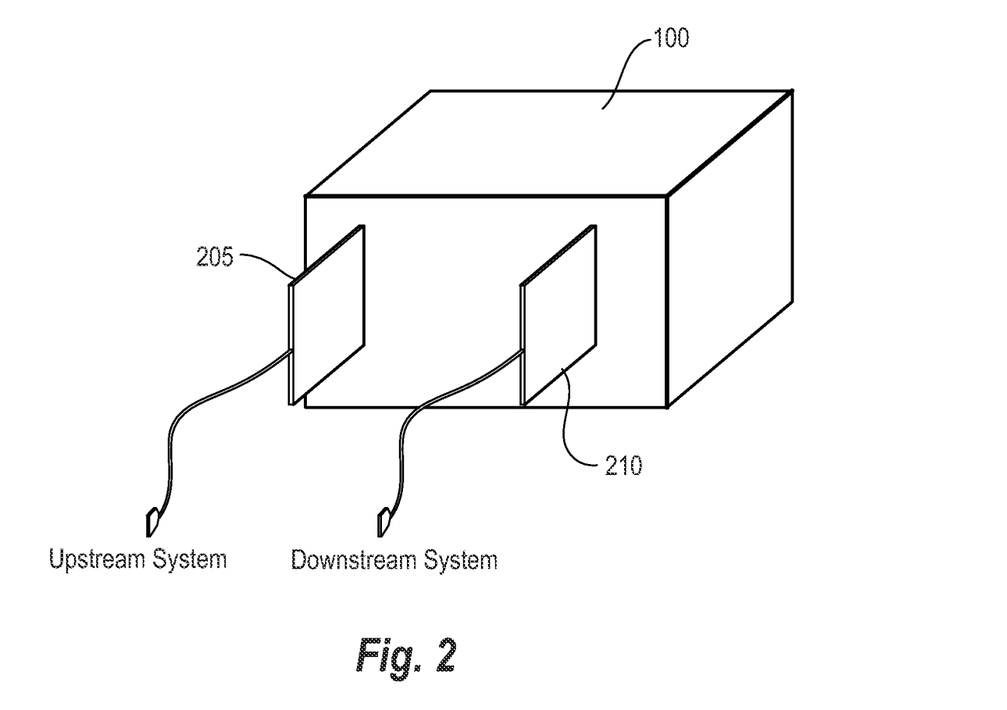
FIG. 2 is a conceptual diagram of PCI-E chassis with two cabled PCI-E interface modules according to an example embodiment.

FIG. 2 is a conceptual diagram of PXI-E chassis 100 with two cabled PCI-E interface modules 205 and 210 according to an example embodiment. This diagram is provided to show how cabled PCI-E interface modules can connect PXI-E chassis 100 with other system components.

In the example of FIG. 2, cabled PCI-E interface module 205 is a target module located in system slot 1 of chassis 1. Consequently, it operates under the control of an upstream host to control other components of PXI-E chassis 100, such as peripheral modules in peripheral slots 2-9 and 11-18. Cabled PCI-E interface module 210, on the other hand, is a host module located in one of peripheral slots 2-9 and 11-18. Consequently, it is controlled by cabled PCI-E interface module 205 and is connected to a downstream device or system, such as a cascaded chassis or RAID.

In an alternative implementation, cabled PCI-E interface module 205 can be reconfigured to operate as a host module, or cabled PCI-E interface module 210 can be reconfigured to operate as a target module. This can be accomplished, for example, by toggling a switch on either of these modules to change their respective directions of operation, as will be described with reference to FIGS. 3 and 4. Where cabled PCI-E interface module 205 is reconfigured to operate as a host module, it can be connected to a downstream system rather than an upstream system as shown in FIG. 2. Similarly, where cabled PCI-E interface module 210 is reconfigured to operate as a target module, it can be connected to an upstream system rather than a downstream system as shown in FIG. 2.

In addition to allowing connections in different directions, cabled PCI-E interface modules 205 and 210 can also be designed to operate with different types of connection cables, such as passive copper cables or active optical cables. Examples of modules that can use both passive copper cables and active optical cables are described below with reference to FIGS. 8 through 10. The ability to use different types of cables can be beneficial because users may have different cost or performance requirements that dictate the types of cables used. For example, some users may require passive copper cables because they are cheaper than active optical cables and do not require additional power, while other users may require active optical cables because they have better transmission characteristics, are easier to physically manage, can operate over longer lengths, and are electrically isolating as opposed to passive copper cables.

Figure 3:
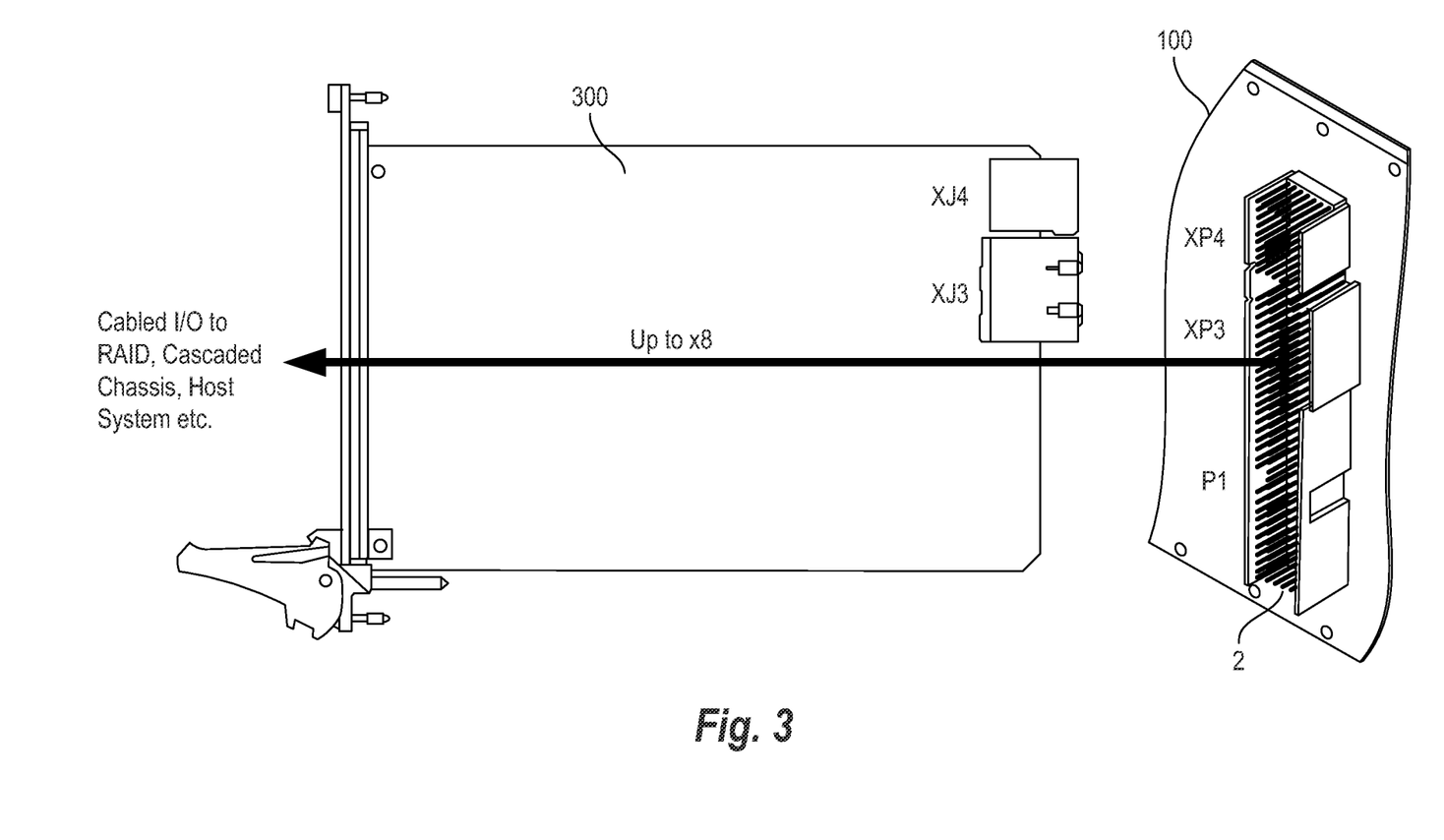
FIG. 3 is a schematic diagram of a bidirectional cabled PCI-E interface module and a peripheral slot 2 of a PCI-E chassis according to an example embodiment.

FIG. 3 is a schematic diagram of a bidirectional cabled PCI-E interface module 300 and a peripheral slot 2 of PXI-E chassis 100 according to an example embodiment. This diagram is provided to illustrate one way of connecting a bidirectional interface module into PXI-E chassis 100. In alternative embodiments, for example, a bidirectional module can also be inserted into system slot 1 of PXI-E chassis 100.

As illustrated in FIG. 3, bidirectional cabled PCI-E interface module 300 has two connectors XJ4 and XJ3 that mate with two connectors XP4 and XP3 of peripheral slot 2. Bidirectional cabled PCI-E interface module 300 provides up to 8 lanes of communication between peripheral slot 2 and another device, which can be a downstream system such as a RAID or a cascaded chassis, or an upstream system such as a host PC, depending on whether bidirectional cabled PCI-E interface module 300 is configured to function as a host module or a target module.

Although not shown in FIG. 3, a manual switch, such as a dip switch, can be formed on bidirectional cabled PCI-E interface module 300 to allow a user to switch between the host configuration and the target configuration.

Figure 4:
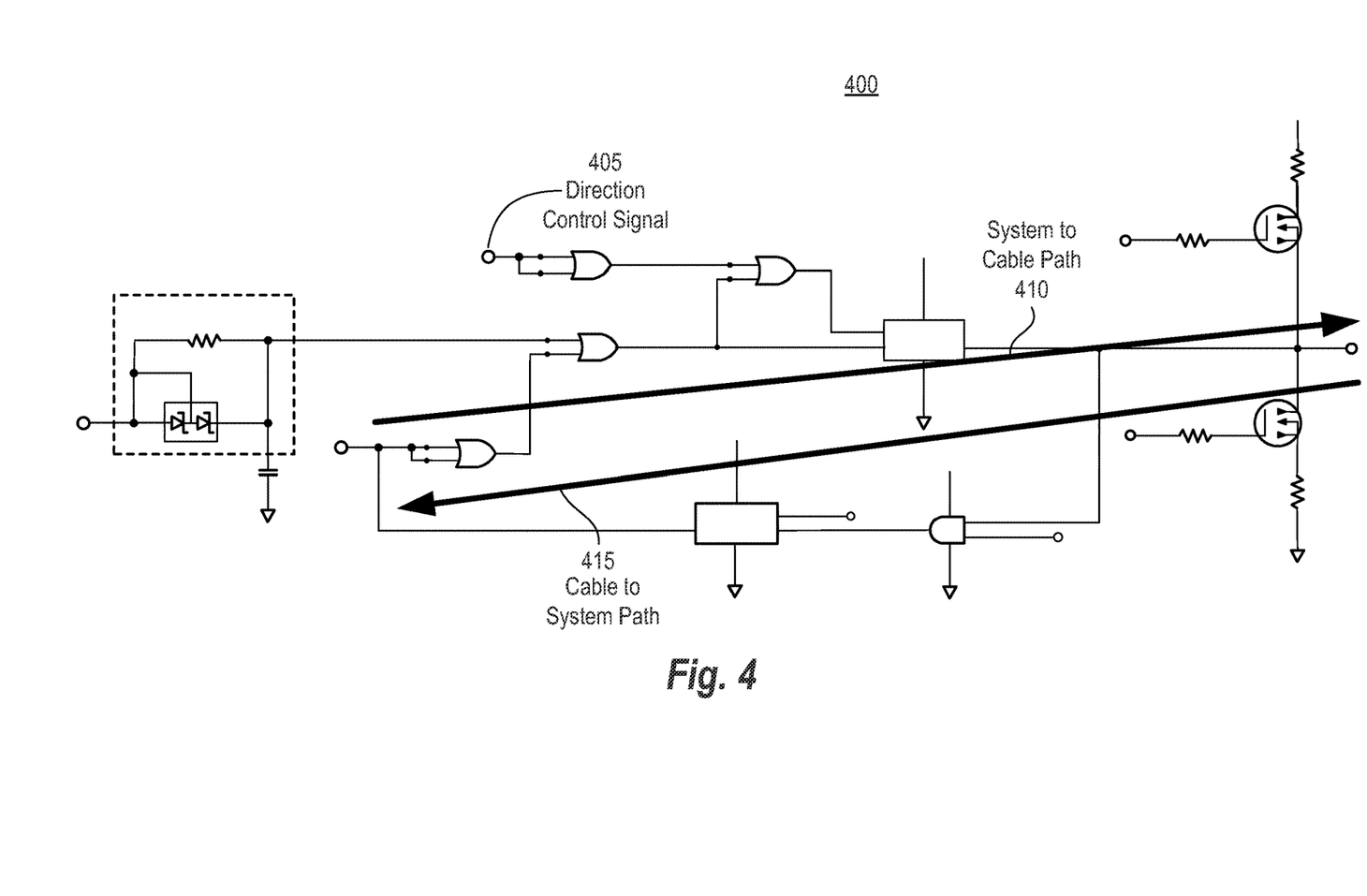
FIG. 4 is a circuit diagram illustrating a portion of a bidirectional cabled PCI-E interface module according to an example embodiment.

FIG. 4 is a circuit diagram illustrating a portion of a bidirectional cabled PCI-E interface module 400 according to an example embodiment. This portion of bidirectional cabled PCI-E interface module 400 includes an implementation of a bidirectional CPERST # sideband signal defined by the PCI-E cabling specification. In this regard, it can be considered to be a signal driving device of bidirectional cabled PCI-E interface module 400.

In general, to achieve bidirectional capability in a PCI-E cabled interface module, both host and target sideband signaling definitions should be implemented in parallel, and their use should be mutually exclusive to prevent contention. For instance, in FIG. 4, parallel signaling pathways are indicated by two arrows labeled 410 and 415, and mutual exclusivity is maintained through the use of a direction control signal 405. Direction control signal 405 can be controlled by a selection device such as a logical or mechanical switch. One example of such a switch is the dipswitch described above with reference to FIG. 3. Direction control signal 405 can have a first value indicating that bidirectional cabled PCI-E interface module 400 is to function as a host module, and a second value indicating that bidirectional cabled PCI-E interface module 400 is to function as a target module.

Other host and target sideband signals can be duplicated in a manner similar to the CPERST # sideband signal illustrated in FIG. 4. Moreover, the parallel signaling pathways for the other sideband signals can be controlled by the same direction control signal 405 to allow convenient switching of bidirectional cabled PCI-E interface module 400 between target and host configurations.

Figure 5:
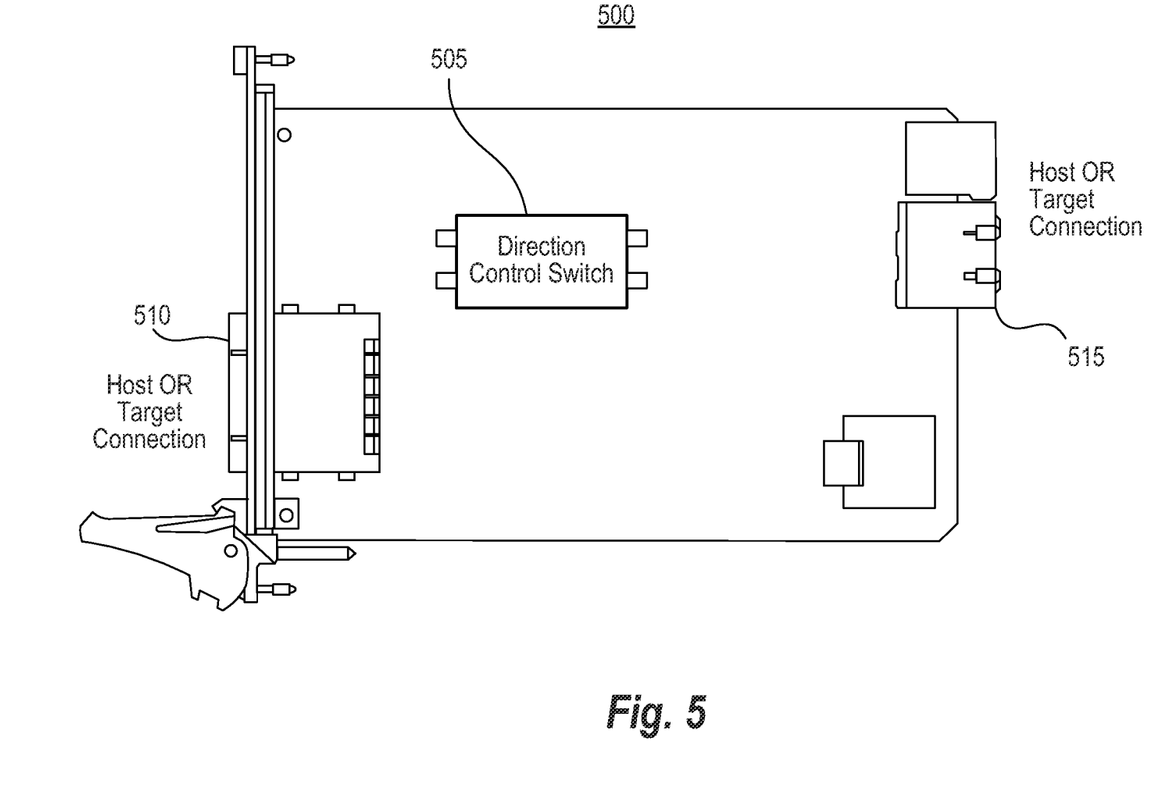
FIG. 5 is a schematic diagram of a bidirectional cabled PCI-E interface module according to an example embodiment.

FIG. 5 is a schematic diagram of a bidirectional cabled PCI-E interface module 500 according to an example embodiment. This diagram shows the layout of host/target connectors 510 and 515 on opposite sides of bidirectional cabled PCI-E interface module 500. It also shows the layout of a direction control switch 505 for switching bidirectional cabled PCI-E interface module 500 between a host configuration and a target configuration. Bidirectional cabled PCI-E interface module 500 is typically implemented as a CPCI-E or PXI-E module such as Agilent's M9021A, which is compatible with a chassis such as Agilent's M9018A.

Where bidirectional cabled PCI-E interface module 500 is in the host configuration, host/target connectors 510 and 515 provide host connections to a downstream device or system. On the other hand, where bidirectional cabled PCI-E interface module 500 is in the target configuration, host/target connectors 510 and 515 provide target connections to an upstream device or system. Bidirectional cabled PCI-E interface module 500 can be changed between the host configuration and the target configuration by toggling direction control switch 505.

Figure 6:
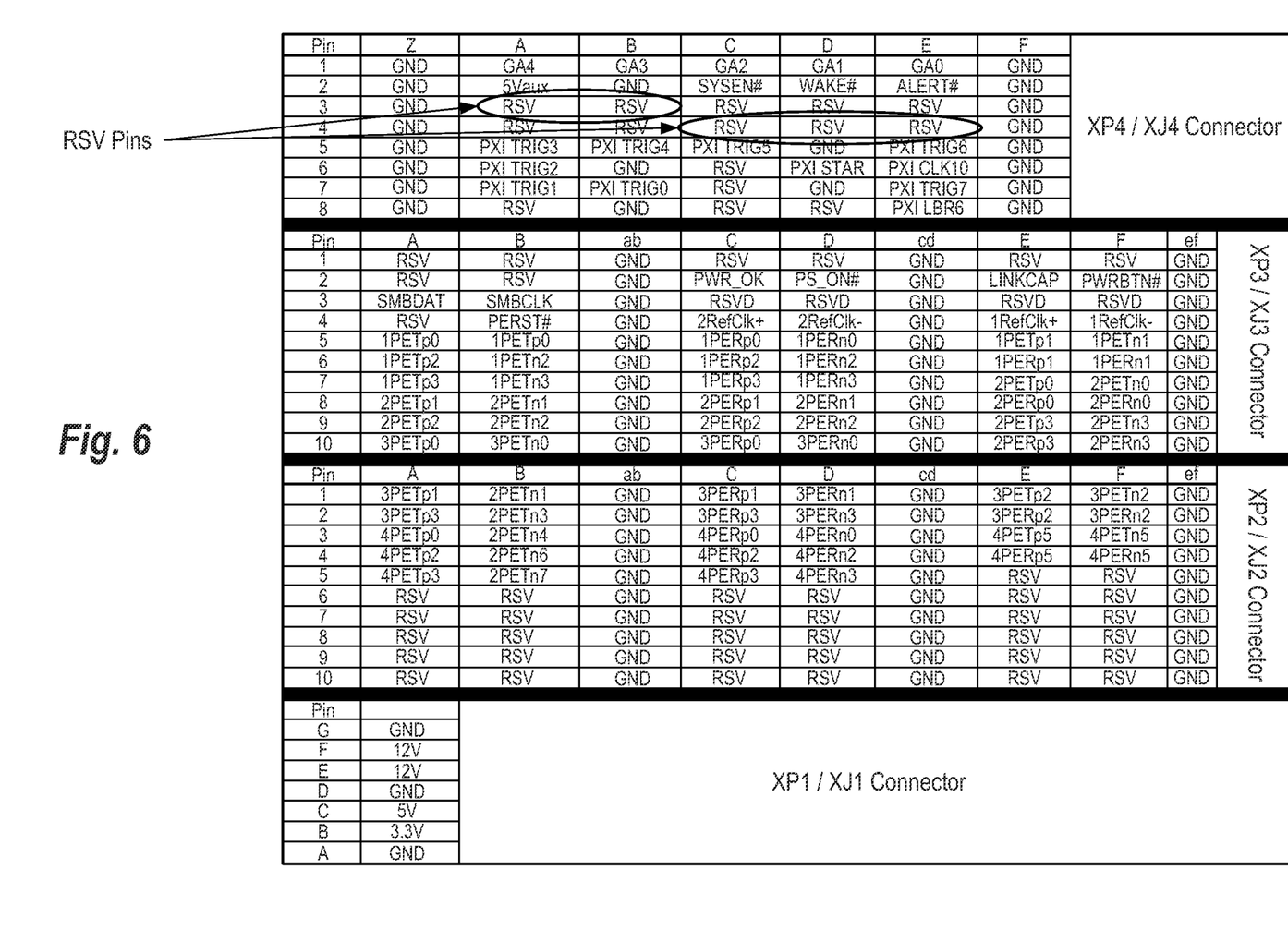
FIG. 6 is a pin assignment chart of a system slot in a PCI-E based chassis according to an example embodiment.

FIG. 6 is a pin assignment chart of a system slot (e.g., system slot 1 of FIG. 1) in a PCI-E based chassis according to an example embodiment. The pin assignments of FIG. 6 are standardized and can be found in a commercial PXI-E chassis, for example. However, certain reserved pin assignments have been highlighted to indicate how these pin assignments can be modified to allow a bidirectional cabled PCI-E interface module to be inserted into a system slot.

Figure 7:
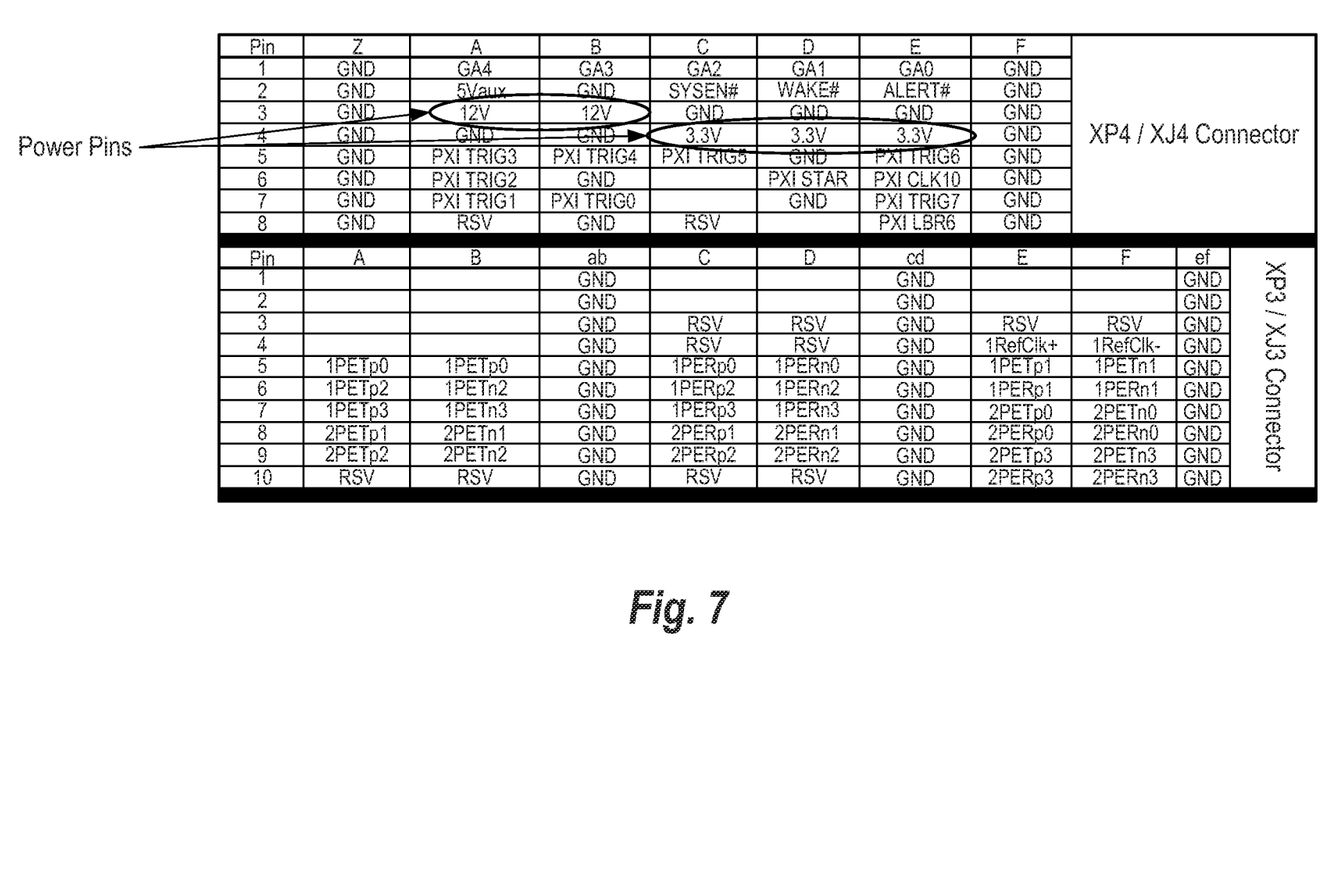
FIG. 7 is a modified pin assignment chart of two connectors in a peripheral slot according to an example embodiment.

FIG. 7 is a pin assignment chart of two connectors in a peripheral slot (e.g., peripheral slot 2 of FIG. 3) in a PCI-E based chassis according to an example embodiment. Only two connectors are shown in FIG. 7 because the bidirectional cabled PCI-E interface module has only two connectors—an XJ4 connector and a XJ3 connector. The reason for using only two connectors is that the system slot and peripheral slots in PXI-E chassis 100 have XP4 and XP3 connectors in common. Thus, a bidirectional cabled PCI-E interface module with only these two connectors can be used in both a system slot and a peripheral slot.

The XP4 and XP3 connectors of FIG. 7 differ from those of FIG. 6 in that the connectors of FIG. 7 include power pins in place of the reserved pins. However, to allow a bidirectional cabled PCI-E interface module with only an XP4 and XP3 connectors in the system slot, the system slot can be modified by overriding the reserved pins to be power pins. In other words, the pin assignments of the system slot as shown in FIG. 6 can be modified to be the same as those of the peripheral slot as in FIG. 7 so that the same cabled interface module can be used in both types of slots. This overriding can be accomplished by modifying the chassis backplane to change the pin assignments, e.g., through reconfigurable switch fabric 105.

Figure 8A:
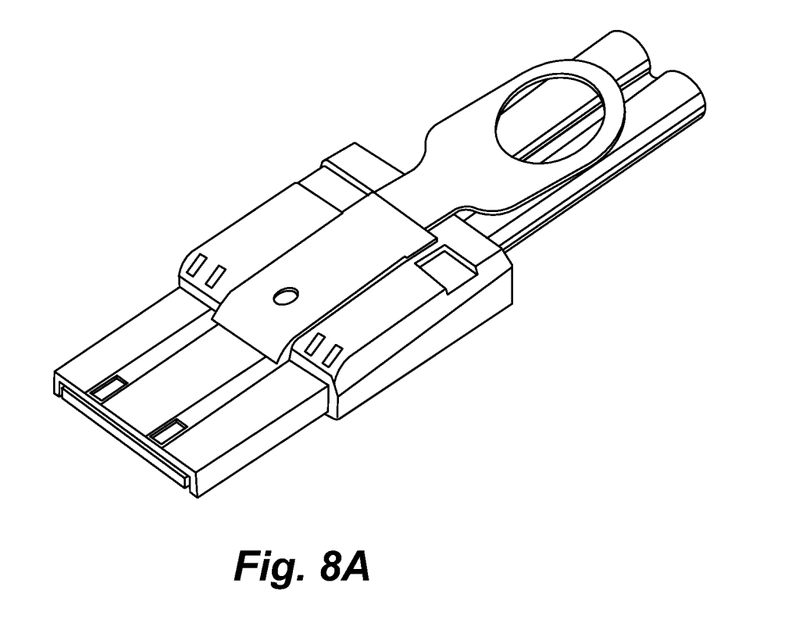
FIGS. 8A and 8B are schematic diagrams of different iPASS connectors for a cabled PCI-E interface module according to example embodiments.
Figure 8B:
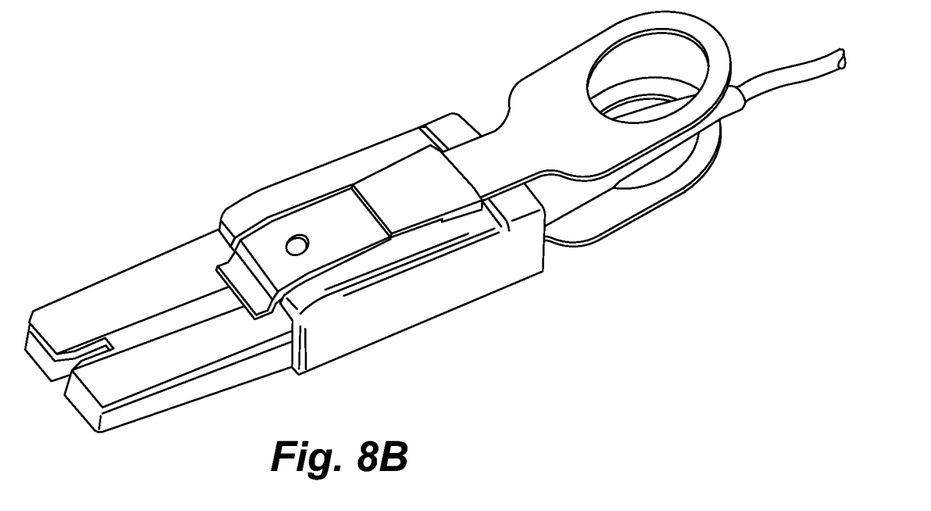
Figure 9:
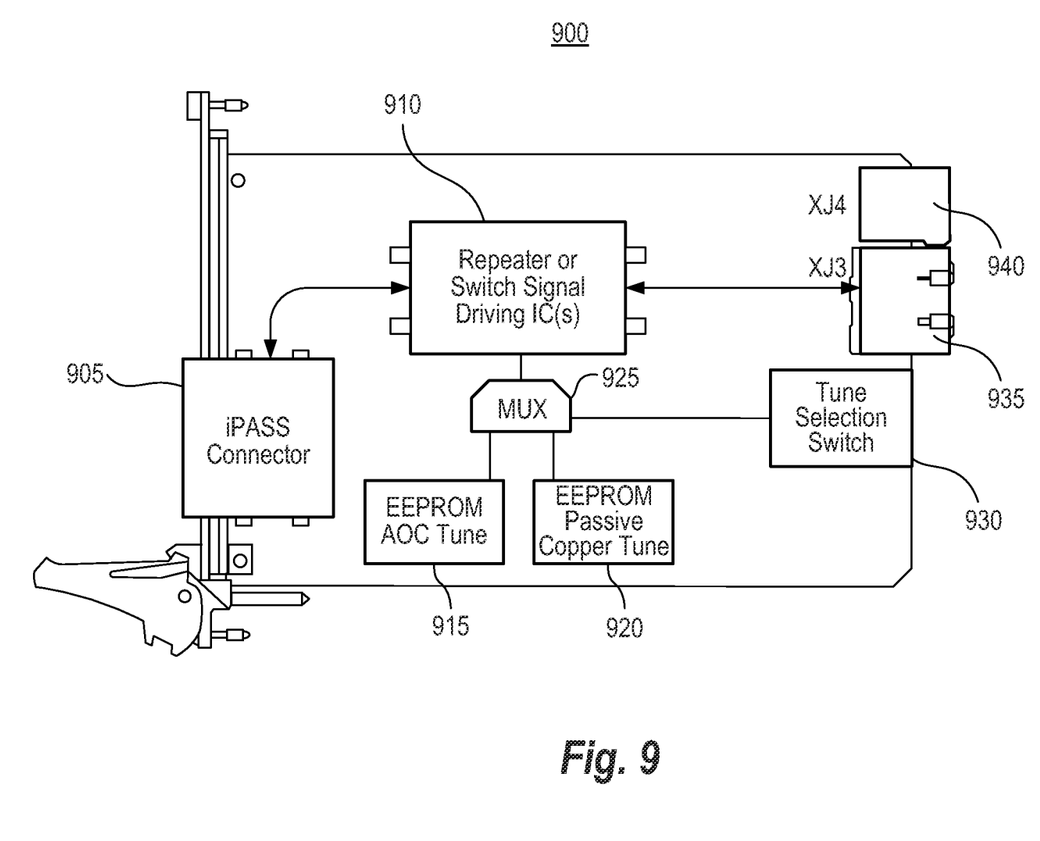
FIG. 9 is a schematic diagram of a cabled PCI-E interface module configured to operate with passive copper cable or active optical cable according to an example embodiment.
Figure 10:
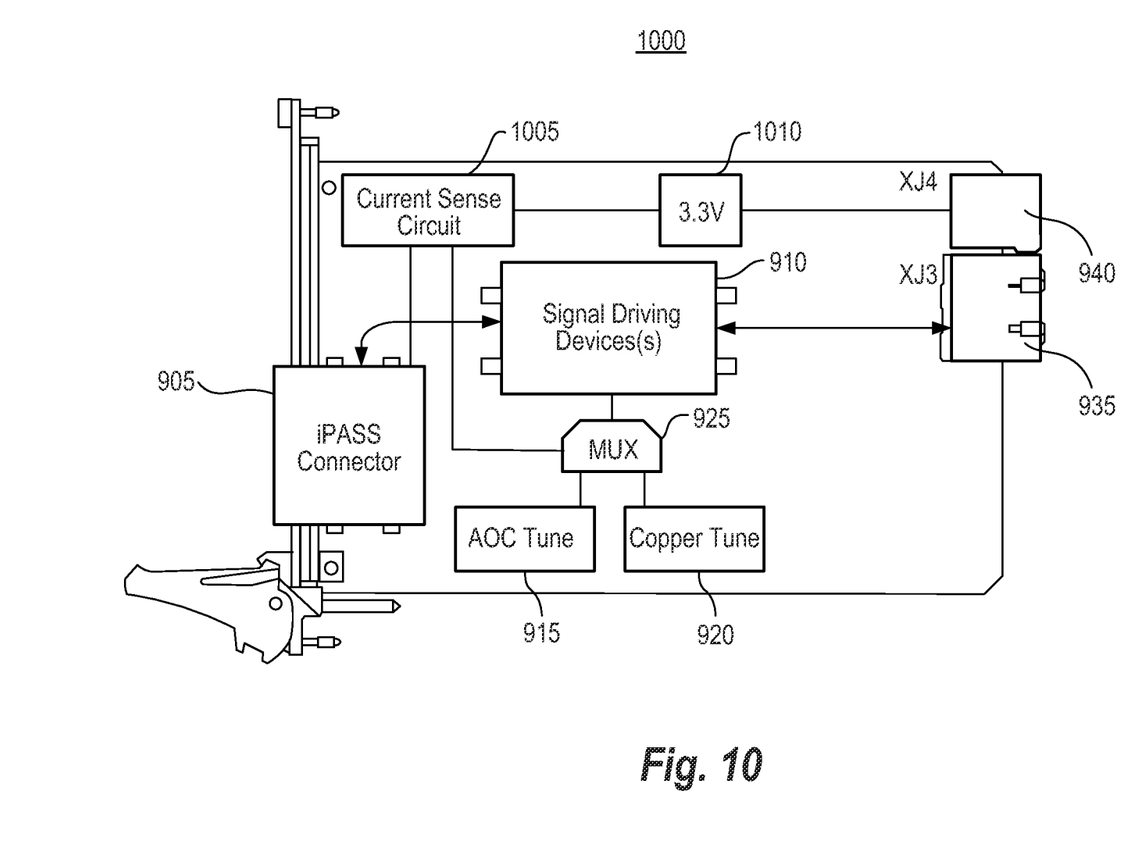
FIG. 10 is a schematic diagram of another cabled PCI-E interface module configured to operate with passive copper cable or active optical cable according to an example embodiment.

FIGS. 8 through 10 illustrate modifications that can be made to a cabled PCI-E interface module for compatibility with multiple types of connector cables. In particular, FIGS. 8 through 10 show modifications that allow a cabled PCI-E interface module to alternately use passive copper cable or active optical cable according to current system requirements.

The modifications shown in FIGS. 8 through 10 can be made together with those used to create bidirectional modules, or they can be made independently. In other words, a PCI-E interface module can be implemented with multi-cable capability, bidirectional capability, or both of these capabilities in combination.

There are various tradeoffs between passive copper cables and active optical cables, which may prompt a user to select between these two types of cables. For example, passive copper cables are relatively inexpensive, but there are restrictions on using passive copper cables to transmit high-speed signals over long distances due to attenuation through the medium. For example, at Gen 2 signaling rates of 5 GB/s, a signal can only be transmitted reliably through about two to three meters passive copper cable. Accordingly, for longer transmissions, active optical cables or passive copper cables with repeaters may be required.

There are also differences between passive copper cables and active optical cables that require modules to use different signal driving characteristics for these different types of cables. For example, communicating from a backplane of a chassis to a cabled interface using passive copper cable has generally required the use of repeater circuitry to boost the amplitude of data signals and drive them across a potentially long and lossy cable. On the other hand, communicating to optical circuits close to a connector may require adjustments to the interface module as to not overdrive signals and saturate them at optical receivers. Due to these and other differences, passive copper and active optical cables have traditionally required separate drive circuitry.

In the examples of FIGS. 8 through 10, three general concepts are used to produce a cabled PCI-E interface module capable of employing both passive copper and active optical cable. These concepts include the use of an active optical cable with the same connection standard as a passive copper cable, the ability to adjust the signal driving characteristics of the module according to the type of cable used, and the ability to detect automatically the type of cable used in order to adjust the signal driving characteristics.

The different signal driving characteristics of passive optical cable and active optical cable can be characterized by a set of storable parameters referred to as a "tune". For example, drive characteristics of passive copper cable can be stored as a first tune, and drive characteristics of active copper cable can be stored as a second tune. The first and second tunes can be stored in a cabled interface module and then loaded into a signal driving device within the module according to whether a user has selected to use passive copper cable or active optical cable. Such a signal driving device can be, for example, a PCI-E switch or a repeater used to drive PCI-E cabling. Accordingly, the first or second tune can be loaded into the PCI-E switch or repeater via one or more boot configuration EEPROMs of the cabled PCI-E interface module. The loaded first or second tune can then determine the drive characteristics of PCI-E data lanes based on the configuration of the PCI-E switch or repeater. Although a PCI-E switch or repeater are presented as examples of signal driving devices, a signal driving device can be any of various PCI-E compatible devices, such as various types of redrivers, retimers, or switches. In addition, a signal driving device can be passive feed through for data but have active circuitry for sideband signals.

FIGS. 8A and 8B are schematic diagrams of different iPASS connectors for a cabled PCI-E interface module according to example embodiments. More specifically, FIG. 8A shows an iPASS connector for connecting passive copper cable to a cabled PCI-E interface module, and FIG. 8B shows an iPASS connector for active optical cable using the same connection standard as the passive copper cable connector. Although the passive copper cables do not require power, the iPASS connection standard nevertheless allows power to be provided to the active optical cable.

The iPASS connector for the active optical cable contains electrical-to-optical integrated circuits (ICs) with different signal driving characteristics than a passive copper cable. Accordingly, the cabled PCI-E interface module is configured to adjust its signal driving characteristics according to whether it is connected to passive copper cable or active optical cable.

FIG. 9 is a schematic diagram of a cabled PCI-E interface module 900 configured to operate with passive copper cable or active optical cable according to an example embodiment.

Referring to FIG. 9, cabled PCI-E interface module 900 comprises an iPASS connector 905, a signal driving device 910, a first tune storage EEPROM 915, a second tune storage EEPROM 920, a multiplexer 925, a selection switch 930, an XJ3 connector 935, and an XJ4 connector 940.

iPASS connector 905 is configured to receive one of the iPASS connectors illustrated in FIGS. 8A and 8B. Accordingly, it is compatible with an iPASS connector for passive copper cable or active optical cable.

Signal driving device 910 is configured to drive iPASS connector 905 with different signal driving characteristics according to whether iPASS connector 905 is connected to a passive copper cable or an active optical cable. Signal driving device 910 typically comprises a PCI-E switch or repeater.

First tune storage EEPROM 915 stores a first tune for determining signal driving characteristics of active optical cable, and second tune storage EEPROM 920 stores a second tune for determining signal driving characteristics of passive copper cable. One of the first and second tunes can be loaded into signal driving device 910 upon booting of cabled PCI-E interface module 900, or by toggling selection switch 930. Although shown as EEPROMS in FIG. 9, first and second tune storage EEPROMs 915 and 920 could be substituted with other types of circuits or memories, such as a programmable logic device.

Multiplexer 925 receives the first and second tunes and loads one of them into signal driving device 910 based on the value of a control signal output by selection switch 930. Selection switch 930 can be a physical or logical switch, and it can be controlled by an external mechanism, such as a user input, or an internal mechanism such as an automated procedure.

XJ3 and XJ4 connectors 935 and 940 connect cabled PCI-E interface module 900 to a chassis such as PXI-E chassis 100 of FIG. 1. As indicated by two arrows in FIG. 9, data travels between XJ3 connector 935 and iPASS connector 905 by passing through signal driving device 910. This pathway is used for communication between the chassis and a cabled device connected to cabled PCI-E interface module 900. Accordingly, signal driving device 910 drives data received from XJ3 connector 935 using parameters defined by the first or second tune.

FIG. 10 is a schematic diagram of another cabled PCI-E interface module 1000 configured to operate with passive copper cable or active optical cable according to an example embodiment. Cabled PCI-E interface module 1000 is similar to cabled PCI-E interface module 900, except that it further comprises a current sense circuit 1005 and a power line 1010 connected to XJ4 connector 940. In addition, selection switch 930 is omitted, and multiplexer 925 is controlled by an output signal of current sense circuit 1005.

Current sense circuit 1005 is used to detect whether passive copper cable or active optical cable is connected to cabled PCI-E interface module 1000. As indicated above, passive copper cable does not require power, but active optical cable does. Accordingly, where the iPASS connector for active optical cable is connected to iPASS connector 905, the active optical cable draws current through power line 1010. Current sense circuit 1005 senses the presence or absence of current to determine the type of cable connected to cabled PCI-E interface module 1000. Based on the detected type of cable, current sense circuit 1005 outputs a signal to multiplexer 925 so that multiplexer loads the first or second tune from first tune storage EEPROM 915 or second tune storage EEPROM 920 to signal driving device 910.

Because current sense circuit 1005 automatically detects the type of cable connected to cabled PCI-E interface module 1000 and causes cabled PCI-E interface module 1000 to be reconfigured accordingly, it allows a user to readily switch between passive copper cable and active optical cable. By conveniently supporting both passive copper cables and active optical cables, cabled PCI-E interface module 1000 allows users to use either type of cable according to their specific needs. For example, optical cables can be used where electrical isolation and long transmission distances are required.

Figure 11:
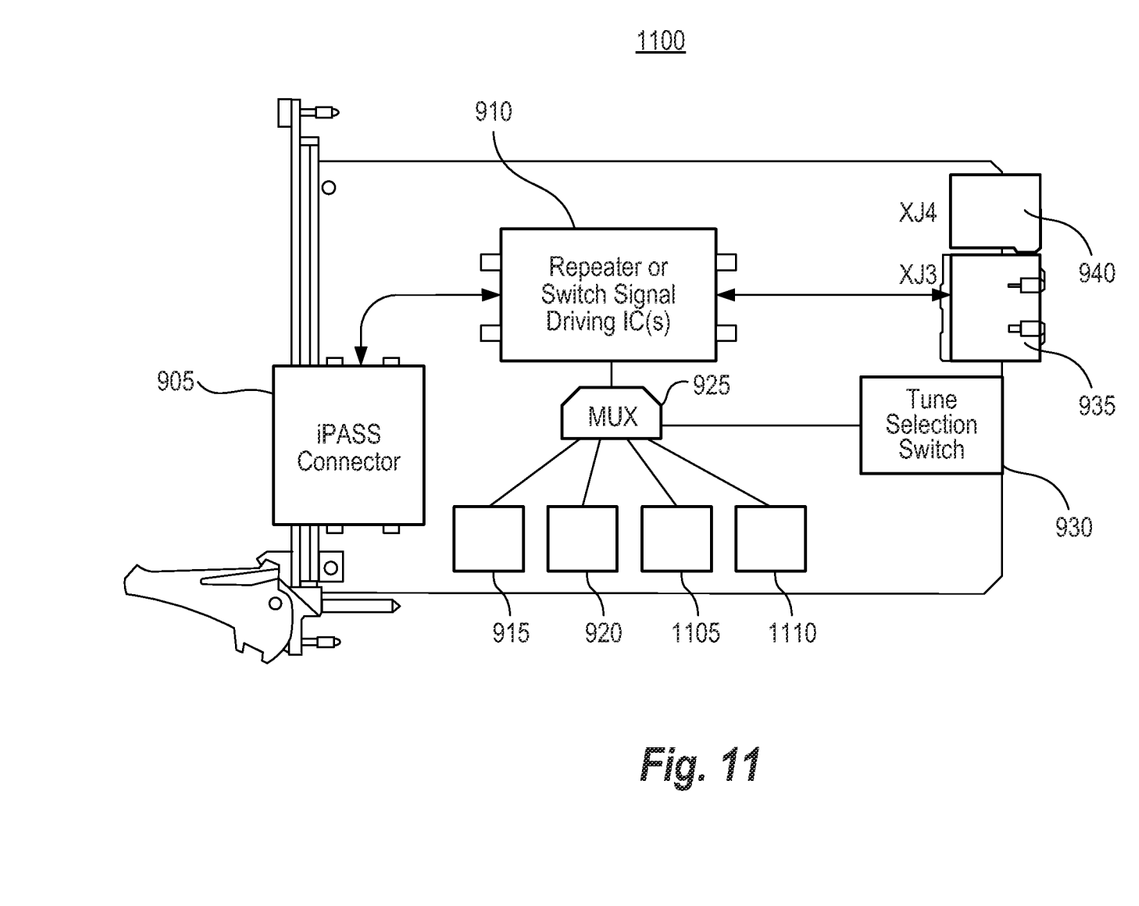
FIG. 11 is a schematic diagram of a cabled PCI-E interface module configured to operate in a host configuration or a target configuration according to an example embodiment.

FIG. 11 is a schematic diagram of a cabled PCI-E interface module 1100 configured to operate in a host configuration or a target according to an example embodiment. Cabled PCI-E interface module 1100 is similar to cabled PCI-E interface module 900 of FIG. 9, except that in addition to configuring signal driving device 910 to drive different types of cables, cabled PCI-E interface module 1100 can also configure signal driving device 910 to drive signals in different directions. In other words, it can configure signal driving device 910 to operate in the host configuration or the target configuration.

Cabled PCI-E interface module 1100 stores information for the target configuration and the host configuration in respective EEPROMs 1105 and 1110. Like the information stored in first and second tune storage EEPROMs 915 and 920, the information stored in EEPROMs 1105 and 1110 can be loaded into signal driving device 910 via multiplexer 925 in response to a control signal output by selection switch 930. Alternatively, different multiplexers could be used to load information related to cable type and information related to bidirectional operation. Moreover, first and second tune storage EEPROMs 915 and 920 could be omitted from cabled PCI-E interface module 1100 to remove multi-cable capability while retaining bidirectional capability.

In addition to the above configurations, cabled PCI-E interface module 1100 may also require different signal driving parameters depending on whether it is in the host configuration or the target configuration, i.e., whether it is operating as a downstream or upstream device. Accordingly, cabled PCI-E interface module 1100 may further store and load one or more tunes corresponding to the host and target configurations.

Although not shown in FIGS. 1 through 11, the described PCI-E modules can be modified to have multiple independent ports corresponding to different signaling pathways. In other words, the PCI-E modules can be multi-port modules such as multi-port cabled PCI-E cards. For example, a PCI-E module could include a first cabled input/output (I/O) port corresponding to a host signaling pathway and configured to be connected to a host module, and a second cabled I/O port corresponding to a target signaling pathway and configured to be connected to a target module. Moreover, there are many alternative ways to configure a PCI-E module with multiple ports, such as configuring one or more ports for bidirectional connections, configuring multiple different ports for host connections, and so on.

Figure 12:
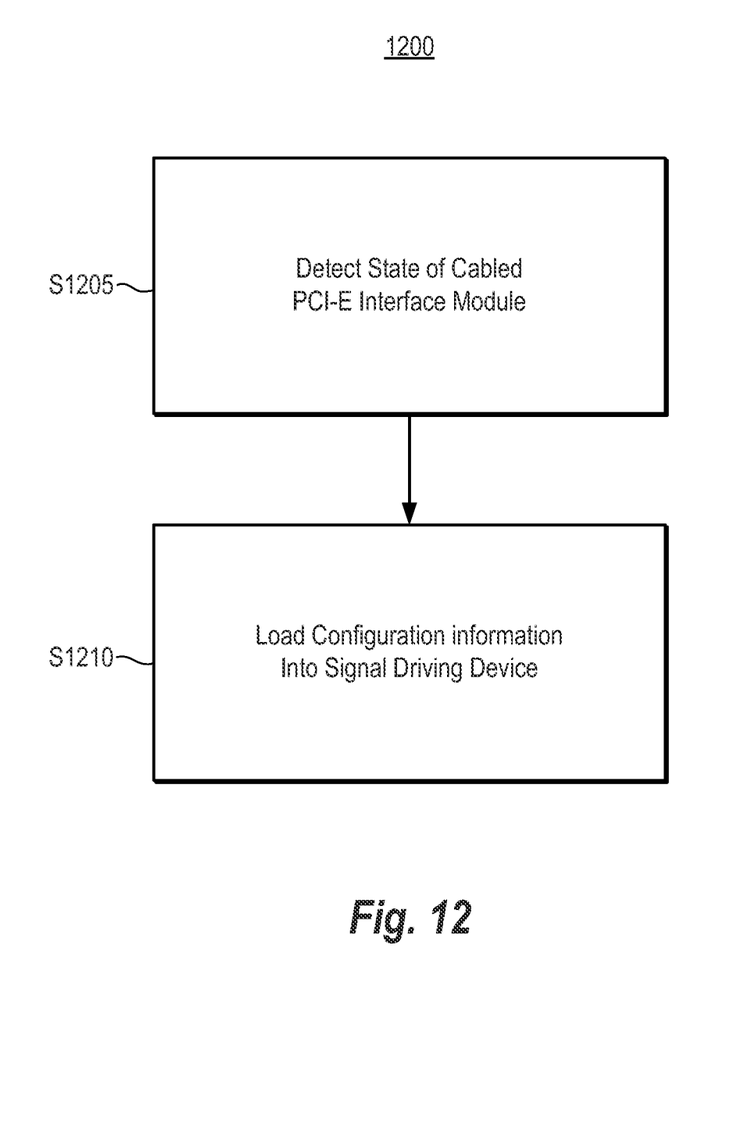
FIG. 12 is a flowchart illustrating a method of configuring a cabled PCI-E interface module according to an example embodiment

FIG. 12 is a flowchart illustrating a method of configuring a cabled PCI-E interface module according to an example embodiment. This method can be used, for example, to change the module between a host configuration and a target configuration, or to change signal driving characteristics according to different types of transmission cables.

Referring to FIG. 12, the method comprises detecting a state of the PCI-E interface module (S1205). This detection can comprise, for example, sensing whether current is flowing through a power line to determine whether an active optical cable is connected to the module. Alternatively the detection can comprise sensing whether a switch has been toggled to change the module from a host configuration to a target configuration.

The method further comprises loading configuration information into a signal driving device of the cabled PCI-E interface module according to the detected state of the module (S1210). The loaded information can include, for instance, a switch image or tune stored in an EEPROM. The loaded information can be used to configure the module as a host or target module, or to configure the module for a specific type of transmission cable.

While representative embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A peripheral component interconnect express (PCI-E) interface module, comprising:
    a first connector configured to interface with a PCI-E compatible cable;
    a second connector configured to interface with a PCI-E based chassis;
    a signal driving device configured to process data transmitted along a data path between the first and second connectors; and
    a selection device configured to select a configuration of the signal driving device and to provide mutually exclusive bidirectional signaling according to a current state of the PCI-E interface module.

2. The PCI-E interface module of claim 1, wherein the signal driving device comprises multiple parallel circuit pathways configured to alternately drive sideband signals for a target or host configuration of the PCI-E interface module, the multiple parallel circuit pathways being mutually exclusive.

3. The PCI-E interface module of claim 1, further comprising a memory device configured to store information defining independent configurations of the signal driving device, wherein the selected configuration is one of the independent configurations.

4. The PCI-E interface module of claim 3, wherein one of the independent configurations comprises a tune for transmitting signals to an active optical cable, and another one of the independent configurations comprises a tune for transmitting signals to a passive copper cable.

5. The PCI-E interface module of claim 1, wherein one of the configurations comprises a tune corresponding to a host configuration of the PCI-E interface module, and another one of the configurations comprises a tune corresponding to a target configuration of the PCI-E interface module.

6. The PCI-E interface module of claim 1, wherein the second connector comprises an XJ3 connector and an XJ4 connector compatible with a PCI eXtensions for instrumentation express (PXI-E) chassis.

7. The PCI-E interface module of claim 1, wherein the selection device is controlled according to a position of a manual switch.

8. The PCI-E interface module of claim 1, further comprising a current sense circuit that senses a current in a power line of the PCI-E interface module and, in response to sensing the current, controls the selection device to select a configuration of the signal driving device for driving an active optical cable.

9. The PCI-E interface module of claim 1, wherein the current state includes whether the PCI-E interface module has been designated to function as a host module versus a target module, or whether the PCI-E interface module is connected to passive copper cable versus active optical cable.

10. The PCI-E interface module of claim 1, further comprising multiple input/output ports implementing multiple parallel signaling pathways for the PCI-E interface module.

11. A method of configuring a peripheral component interconnect express (PCI-E) interface module, comprising:
    detecting a state of the PCI-E interface module; and
    based on the detected state, controlling a signal driving device of the PCI-E interface module to operate the PCI-E interface module in one of two bidirectional mutually exclusive modes.

12. The method of claim 11, wherein one of the modes operates the PCI-E interface module as a host module, and another one of the modes operates the PCI-E interface module as a target module.

13. The method of claim 11, wherein one of the modes drives data signals according to characteristics of an active optical cable, and another one of the modes drives data signals according to characteristics of a passive copper cable.

* * * * *